United States Patent
Zeng et al.

(10) Patent No.: US 11,860,853 B2
(45) Date of Patent: Jan. 2, 2024

(54) AUTOMATED DATA HEALTH REASONING

(71) Applicant: Microsoft Technology Licensing, LLC, Redmond, WA (US)

(72) Inventors: Liangzhao Zeng, Cupertino, CA (US); Ting Yu Cliff Leung, San Jose, CA (US); Jimmy Hong, Belmont, CA (US); Yat On Lau, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/454,229

(22) Filed: Nov. 9, 2021

(65) Prior Publication Data
US 2023/0145069 A1     May 11, 2023

(51) Int. Cl.
*G06F 16/00*     (2019.01)
*G06F 16/23*     (2019.01)
*G06F 16/215*     (2019.01)

(52) U.S. Cl.
CPC ........ *G06F 16/2365* (2019.01); *G06F 16/215* (2019.01)

(58) Field of Classification Search
CPC ...... G06F 16/21; G06F 18/2413; G06F 18/28; G06F 11/2094; G06F 21/31;
(Continued)

(56) References Cited

U.S. PATENT DOCUMENTS 10,984,128 B1 *   4/2021   Hoffer ................. G16B 50/30
11,204,851 B1     12/2021   Iyengar et al.
(Continued)

OTHER PUBLICATIONS

"Non-Final Office Action Issued in U.S. Appl. No. 17/454,232", dated Sep. 28, 2023, 11 Pages.
(Continued)

*Primary Examiner* — Shyue Jiunn Hwa
(74) *Attorney, Agent, or Firm* — Nicholas De Vos Webster & Elliott LLP

(57) ABSTRACT

Embodiments of the system in include a memory that stores a metamodel including a plurality of predefined characteristics for data sets. A data repository stores a plurality of heterogeneous data sets, each of the plurality of data sets comprising a plurality of data batches received over time. An interface receives a new data set for storage into the data repository, and data health reasoner to retrieve the stored metamodel from the memory, the stored metamodel including a plurality of predefined characteristics. The data health reasoner determines measured values of a subset of the plurality of predefined characteristics identified based on the stored metamodel, and determines a set of data health metrics for the data set based on the measured values of the subset of the set of the predefined characteristics. The data health reasoner formulates a plurality of data validation assertions for the data set and apply the plurality of data validation assertions to each instance of the data set. A user interface receives a request from a service that consumes data from the data set, and provides the plurality of data validation assertions to the service with the data from the data set, wherein each of the plurality of heterogeneous data sets in the data repository have a plurality of data validation assertions derived from the stored meta-model.

20 Claims, 9 Drawing Sheets

(58) Field of Classification Search
CPC ...... G06F 21/316; G06F 21/32; G06F 21/445;
G06F 21/45; G06F 21/53; G06F 21/57;
G06F 21/575; G06F 21/6218; G06F
21/6245; G06F 21/64; G06F 2221/2129;
G06F 2221/2149; G06F 21/6254; G06F
21/10; G06F 16/137; G06F 16/24575;
G06F 16/2471; G06F 16/248; G06F
16/258; G06F 16/337; G06F 16/345;
G06F 16/436; G06F 16/9535; G06F
18/2137; G06F 21/44; G06F 21/60; G06F
21/602; G06F 21/62; G06F 21/6209;
G06F 21/6272; G06F 21/645; G06F
21/73; G06F 2221/2137; G06F 9/547;
A61B 5/0535; A61B 5/349; A61B 5/366;
A61B 5/7264; A61B 5/7285; G16B
20/00; G16B 20/20; G16B 25/10; G16B
40/00; G16B 40/20
See application file for complete search history.

(56) References Cited

U.S. PATENT DOCUMENTS

| | | | |
|---|---|---|---|
| 2011/0082712 A1* | 4/2011 | Eberhardt, III | G16Z 99/00 705/4 |
| 2017/0046484 A1* | 2/2017 | Buckler | G16H 10/60 |
| 2021/0248144 A1 | 8/2021 | Haile | |
| 2022/0228102 A1* | 7/2022 | Le | G16B 40/00 |
| 2023/0147939 A1 | 5/2023 | Zeng et al. | |

OTHER PUBLICATIONS

Xenonstack, "Data Ingestion, Processing and Big Data Architecture Layers", Medium.com blog post dated Mar. 2, 2017, 28 pages. (Year: 2017).

Zeng, Liangzhao, "Towards Data Quality Management at LinkedIn", LinkedIn Engineering blog posted dated Jun. 9, 2022, 5 pages. (Year: 2022).

* cited by examiner

FIG. 6

Data Set X
Data Validation Assertions

| Property | Value | | | Assertion | Value |
|---|---|---|---|---|---|
| Arrival Frequency | Daily | | | Schema Change Assertion | No Alert |
| Partition Type | Partitioned | | | Data Availability Assertion | Email Alert |
| Root Path | /route/subroute/... daily | | | | |
| Alert Delivery Mode | ASAP | | | | |
| Expected Arrival Time | 06:01 | | | | |

AUTOMATED DATA HEALTH REASONING

TECHNICAL FIELD

The present disclosure generally relates to data health, and more specifically, relates to automated data health reasoning.

BACKGROUND

Data health can refer to the status and/or quality of data stored in a data repository, or data storage system. Data health management can refer to software tools for managing data health in a repository.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 6 is an example of a user interface to enable editing of customized data validation assertions in accordance with some embodiments of the present disclosure.

DETAILED DESCRIPTION

Figure 1:
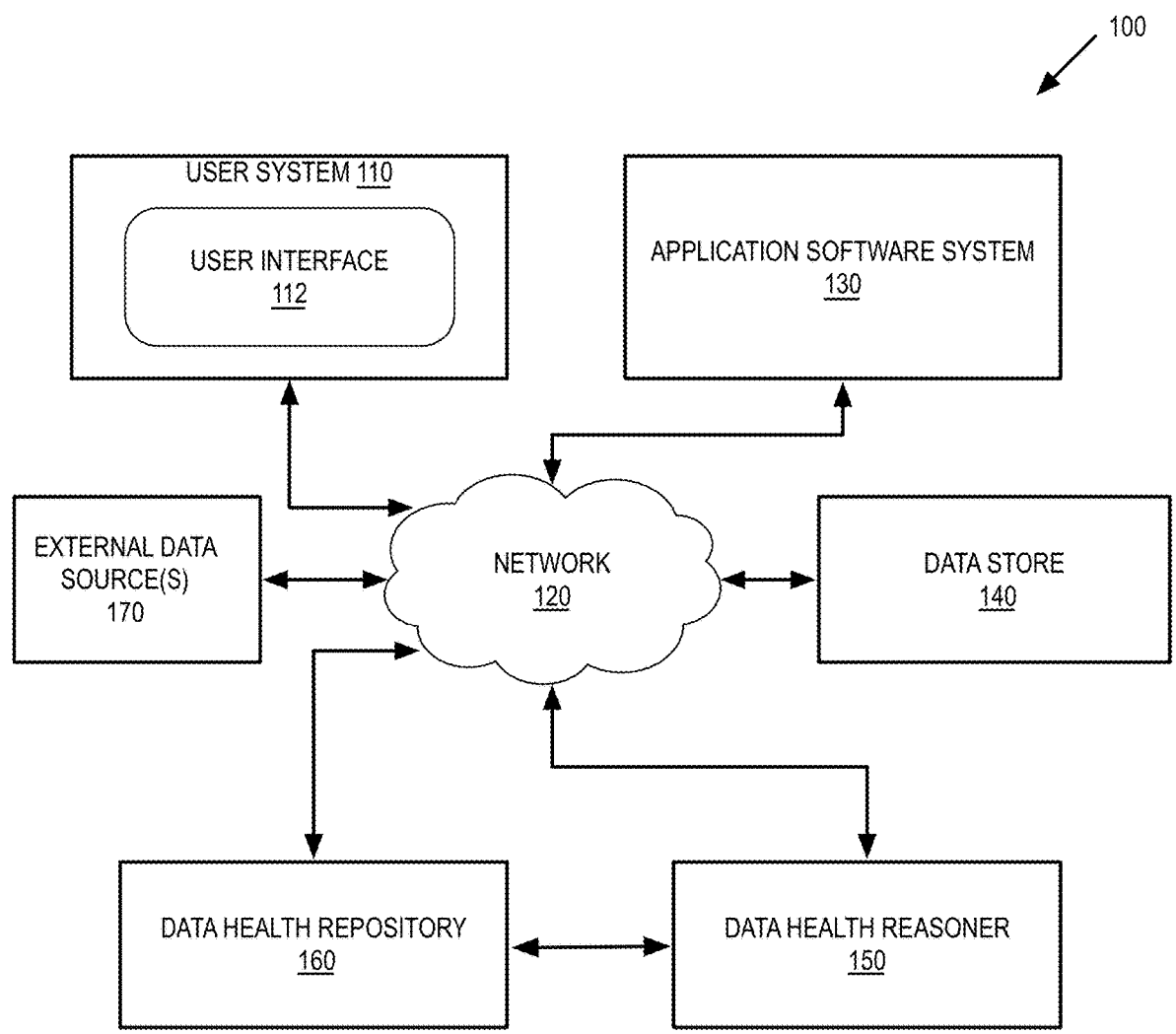
FIG. 1 illustrates an example computing system 100 that includes a data health reasoner 150 in accordance with some embodiments of the present disclosure.

In other systems, data health management is accomplished using low level programming, which requires information technology (IT) and programming skills to implement. Other approaches may provide some text description about data health, but do not enable any enforcement of data health standards.

Aspects of the present disclosure are directed to automatic data health management. In other systems, rules to validate data health and triggered alerts are hand coded. Hand coding these rules and triggers requires IT and programming skills, and also delays the addition of new data streams to a repository until such hand coding can be completed. In a system that receives heterogeneous data from a large number of sources, the hand coding of rules and triggers can quickly become unmanageable.

In some alternative approaches, text descriptions of data health requirements are provided to external data providers, and the external data providers are required to adhere to the data health requirements expressed in those text descriptions. In a larger system that has a significant number of data providers, the task of ensuring that each data provider has correctly interpreted the text descriptions and is adhering to its respective data health requirements is very challenging and time consuming to manage.

Aspects of the present disclosure address the above and other deficiencies by providing a system for automatic data health reasoning, which derives data health metrics automatically from received data, creates rules to validate incoming data, and triggers data health management events automatically. A collection of data received from a data source is referred to as a data set. A data set shares the same characteristics, or data metrics. A data set consists of multiple data batches, received over time. A data batch is a data partition or data version. When the data batch is only part of a dataset then it is defined as data set partition. When the data batch is a complete set of data, then it is defined as a version of data set. In one embodiment, the system maintains metadata for each data batch, as well as for the data set.

The system utilizes a metamodel language describing any characteristics that may be applicable to any data set. The metamodel defined by the metamodel language includes one or more predefined characteristics that are general and may be applicable any data set. The metamodel is extendible, and can be used to characterize any data set. The metamodel defines the characteristics that data health metrics are based on. Data health metrics are the measured characteristics of the data, which can include data schema, size, frequency, arrival time, and other characteristics of the expected data batches for a particular data set. The data health rules, also referred to as data validation assertions, are the characteristics that are expected to be met by data batches of a particular data set. The data health management events can include alerts to systems using the data, when one or more of the data validation assertions are not met. In some embodiments, the data health management events can trigger automatic actions, such as the exclusion of a data set from a particular calculation. The disclosed technologies in one embodiment further provide the ability to define custom data health triggers for users, such that users receive notifications when one or more of the data health conditions are not met by data that they use. The disclosed technologies, in one embodiment, additionally enable the data providers to perform pre-tests to determine whether any proposed changes to characteristics of data provided by the data providers would violate any custom-defined data health conditions.

The present system is designed to handle a large number of data sets and data volume of terabytes of data. The system is designed to regularly receive new data sets, from new sources. The new data sets may not have a known set of characteristics. The ability of the system to derive the data health metrics from the observed data streams enables handling of large scale data, and heterogenous data sets. In one embodiment, the present system is utilized with a data repository that has exabytes of data from hundreds of different data sources, and billions of events per hour. Traditional systems that require setting up and verifying assertions on a per data stream basis cannot handle this type of volume. However, the present system is capable of addressing such data streams in a scalable way.

FIG. 1 illustrates an example computing system 100 that includes a data health reasoner 150 in accordance with some embodiments of the present disclosure.

In the embodiment of FIG. 1, computing system 100 includes a user system 110, a network 120, an application software system 130, a data store 140, a data health reasoner 150, and a data health repository 160.

User system 110 includes at least one computing device, such as a personal computing device, a server, a mobile computing device, or a smart appliance. User system 110 includes at least one software application, including a user interface 112, installed on or accessible by a network to a computing device. For example, user interface 112 can be or include a front-end portion of application software system 130. For simplicity, the present application will use as an example a social application system. Social application systems include but are not limited to connections network software, such as professional and/or general social media platforms, and systems that are or are not based on connections network software, such as digital content distribution services, general-purpose search engines, job search software, recruiter search software, sales assistance software, advertising software, learning and education software, or any combination of any of the foregoing. However, the present system can be used with any application that utilizes large data sets.

User interface 112 is any type of user interface as described above. User interface 112 can be used to input search queries and view or otherwise perceive output that includes data produced by application software system 130. For example, user interface 112 can include a graphical user interface and/or a conversational voice/speech interface that includes a mechanism for entering a search query and viewing query results and/or other digital content. Examples of user interface 112 include web browsers, command line interfaces, and mobile apps. User interface 112 as used herein can include application programming interfaces (APIs).

Data store 140 is a data repository. Data store 140 stores a plurality of heterogeneous data sets, each data set including a plurality of data batches, received from external data sources 170. Heterogeneous data sets include data sets that have different content, schemas, delivery frequencies, and times, and/or other differentiators. The data sets can be from different providers, e.g., various third parties.

The data may be received from heterogeneous external data sources 170, which include different systems. The systems can be within the same company. In some embodiments, the systems generating the data may be running on the same computing system 100. But the data source is considered external, in one embodiment, when it originates outside the data store 140.

In the social application system example provided, the heterogeneous data sources for example can include data sources of information about user social connections, data sources of information indicating user posts on the social application, data sources that collect user interactions on third party websites, such as media sites that are affiliated with the social application system. Some of these data sets are generated by the social application. However, they would still be considered external data sources because they are not generated by the data repository management system of computer system 100. The data sets provided as examples are heterogeneous because they are provided on a different schedule, for different data, with different data schemas. However, any one of those differentiators is sufficient to consider data sets heterogenous.

In one embodiment, there can be different heterogeneous external data sources 170 which provide different types, quantities, and frequencies of data to the data store 140. Data store 140 can reside on at least one persistent and/or volatile storage device that can reside within the same local network as at least one other device of computing system 100 and/or in a network that is remote relative to at least one other device of computing system 100. Thus, although depicted as being included in computing system 100, portions of data store 140 can be part of computing system 100 or accessed by computing system 100 over a network, such as network 120.

Application software system 130 is any type of application software system that includes or utilizes functionality provided by the data health reasoner 150. Examples of application software system 130 include but are not limited to connections network software, such as social media platforms, and systems that are or are not based on connections network software, such as general-purpose search engines, job search software, recruiter search software, sales assistance software, advertising software, learning and education software, or any combination of any of the foregoing. The application software system 130 can include a system that provides data to network software such as social media platforms or systems.

While not specifically shown, it should be understood that any of user system 110, application software system 130, data store 140, data health reasoner 150, and data health repository 160 includes an interface embodied as computer programming code stored in computer memory that when executed causes a computing device to enable bidirectional communication with any other of user system 110, application software system 130, data store 140, data health reasoner 150 and data health repository 160 using a communicative coupling mechanism. Examples of communicative coupling mechanisms include network interfaces, inter-process communication (IPC) interfaces and application program interfaces (APIs).

A client portion of application software system 130 can operate in user system 110, for example as a plugin or widget in a graphical user interface of a software application or as a web browser executing user interface 112. In an embodiment, a web browser can transmit an HTTP request over a network (e.g., the Internet) in response to user input that is received through a user interface provided by the web application and displayed through the web browser. A server running application software system 130 and/or a server portion of application software system 130 can receive the input, perform at least one operation using the input, and return output using an HTTP response that the web browser receives and processes.

Each of user system 110, application software system 130, data store 140, data health reasoner 150, and data health repository 160 is implemented using at least one computing device that is communicatively coupled to electronic communications network 120. Any of user system 110, application software system 130, data store 140, data health reasoner 150, and data health repository 160 can be bidirectionally communicatively coupled by network 120, in some embodiments. User system 110 as well as one or more different user systems (not shown) can be bidirectionally communicatively coupled to application software system 130.

A typical user of user system 110 can be an administrator or end user of application software system 130, data health reasoner 150, and data health repository 160. User system 110 is configured to communicate bidirectionally with any of application software system 130, data store 140, data health reasoner 150, and data health repository 160 over network 120, in one embodiment. In another embodiment, the user system 110 communicates with application software system 130 and health data reasoner 150, but does not directly communicate with the data health repository 160.

The features and functionality of user system 110, application software system 130, data store 140, data health reasoner 150, and data health repository 160 are implemented using computer software, hardware, or software and hardware, and can include combinations of automated functionality, data structures, and digital data, which are represented schematically in the figures. User system 110, application software system 130, data store 140, data health reasoner 150, and data health repository 160 are shown as separate elements in FIG. 1 for ease of discussion but the illustration is not meant to imply that separation of these elements is required. The illustrated systems, services, and data stores (or their functionality) can be divided over any number of physical systems, including a single physical computer system, and can communicate with each other in any appropriate manner.

Network 120 can be implemented on any medium or mechanism that provides for the exchange of data, signals, and/or instructions between the various components of computing system 100. Examples of network 120 include, without limitation, a Local Area Network (LAN), a Wide Area Network (WAN), an Ethernet network or the Internet, or at least one terrestrial, satellite or wireless link, or a combination of any number of different networks and/or communication links, as well as wired networks, or computer busses when the system 100 is implemented on a single computer system. The various elements can be connected with different networks and/or types of networks.

Figure 9:
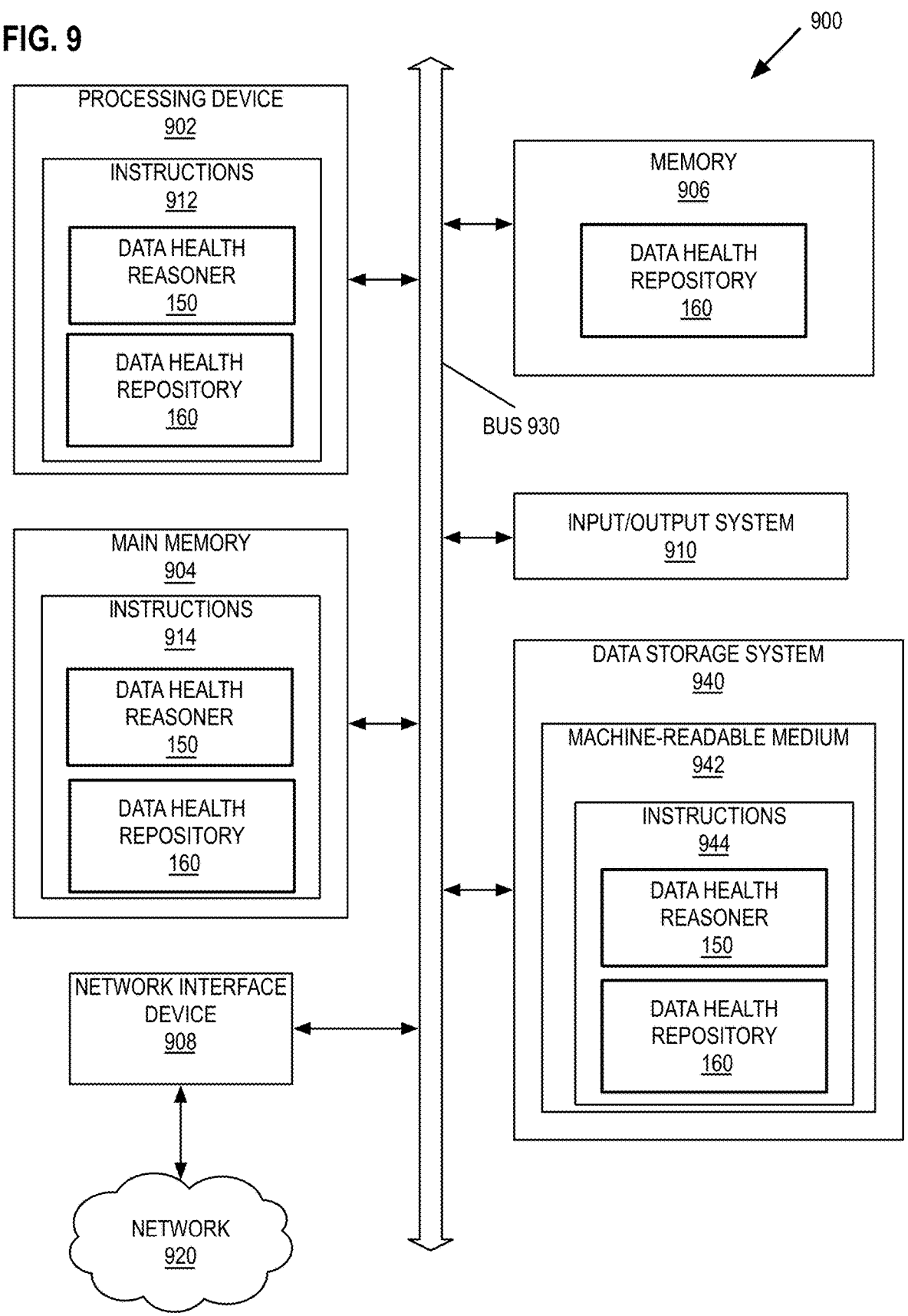
FIG. 9 is a block diagram of an example computer system in which embodiments of the present disclosure can operate.

The computing system 110 includes a data health reasoner component 150 that can evaluate the data health of data from external data sources 170, and a data health repository 160 which can be queried by user systems 110 associated with data consumers. In some embodiments, the application software system 130 includes at least a portion of the data health reasoner 150. As shown in FIG. 9, the data health reasoner 150 can be implemented as instructions stored in a memory, and a processing device 902 can be configured to execute the instructions stored in the memory to perform the operations described herein.

The data health reasoner 150 can automatically create data validation assertions for heterogeneous data sets, and apply those data validation assertions to verify the quality of new data in the data store 140.

The data health repository 160 stores this metadata about the data. The disclosed technologies can be described with reference to the large number of types of data utilized in a social graph application such as a professional social network application. The disclosed technologies are not limited to data associated with social graph applications but can be used to perform data quality validation more generally. The disclosed technologies can be used by many different types of network-based applications which consume large heterogeneous data sets. For example, any predictive system which receives large volumes of different types of data which change over time, could take advantage of such a system. The data health repository 160 stores the metadata generated by the data health reasoner 150.

Further details with regards to the operations of the data health reasoner 150 and the data health repository 160 are described below.

Figure 2:
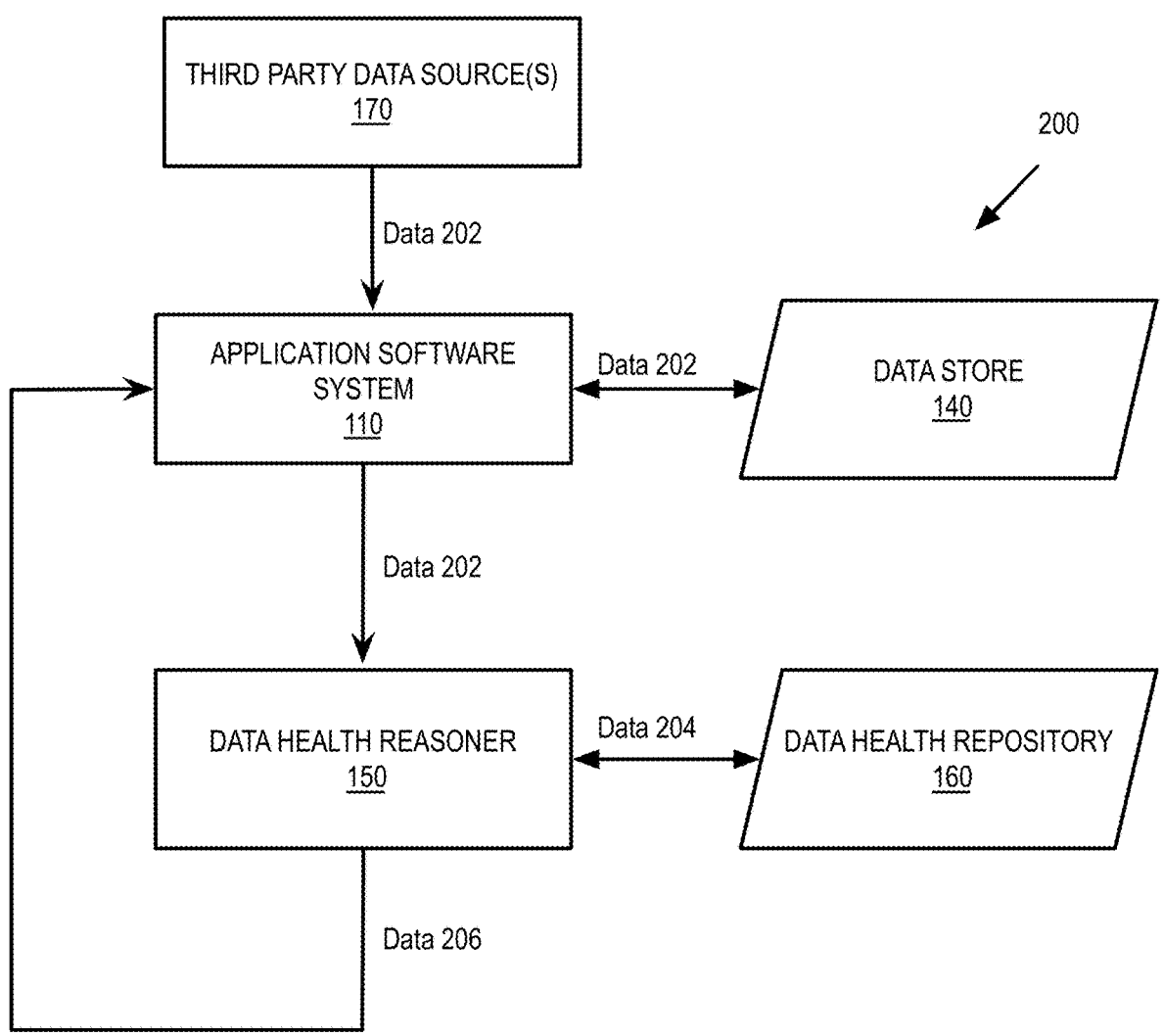
FIG. 2 is a flow diagram of an example method 200 to provide data health reasoning in accordance with some embodiments of the present disclosure.

FIG. 2 is a data flow diagram of an example method 200 to provide data health reasoning in accordance with some embodiments of the present disclosure. The external data sources 170 can be any data source that provides data 202 to data store 140. In one embodiment, the external data source 170 provides data 202 to application software system 110, to process the data into data store 140. The data 202 is additionally provided to the data health reasoner 150.

The data health reasoner 150 utilizes the data batches 202 in a data set to identify the data characteristics, based on a metamodel which represents the predefined characteristics for a data set. A metamodel is a schema representing a collection of existing metrics, one or more of which apply to any data set. The metamodel language provides a formal language that enables semantic description of data health and data validation assertions. In one embodiment, the metamodel language is human readable, as well as computer parseable. The metamodel can be implemented using XML. In one embodiment, the metamodel provides a set of predefined characteristics that are collected for the data set, for example frequency, time of arrival, schema, etc. The metamodel may be extended with additional characteristics, based on business needs and/or the specifics of the data sets received.

The measured values of these characteristics are used to formulate data health metrics for the data set. Embodiments use the collected data about the data set to determine which subset of the predefined data characteristics applies to the data set. In one embodiment, the system uses a statistical analysis of multiple data batches in the data set to determine the data characteristics. In one embodiment, a machine learning system can be used to derive the data characteristics. Once these characteristics are identified, the system derives the data health metrics for the data. In one embodiment, the system includes a set of predefined characteristics, defined by the metamodel, and compares the actual characteristics of the data batches received in the data set to those predefined characteristics. For example, a characteristic may be "time of arrival." The system observes the actual time of arrival of the data batches, and based on that observation determines the data health metrics for the data model.

In one embodiment, the system initially sets the data health metrics based on the observed conditions of the first data batch. As subsequent data batches are received the values are refined. In one embodiment, the system continuously refines these values. In one embodiment, the system collects data over multiple data batches before defining the initial values. In one embodiment, the initial values are defined after three data batches have been received. In one embodiment, the system may use a standard statistical model to exclude outliers. In one embodiment, data which is more than two standard deviations outside the expected value range is dropped as outlying data.

In one embodiment, the metamodel language provides the ability to define additional characteristics for data sets, beyond the predefined characteristics. In one embodiment, such added characteristics may be based on existing characteristics, in which case it may be applied to existing data batches in the data set. In another embodiment, such added characteristics may be new, in which case the above process of generating the data health metrics based on the observed characteristics is used. For example, a new characteristic may be the presence or absence of a particular field, the use of Unicode characters, or any other aspect of that data which can be checked and stored as metadata.

The data health metrics are the data characteristics that must be met by each data batch. The data health metrics describe, for example, the format, frequency, size, and other characteristics of the data set. For example, the data health metrics for a data set can be that the data is partitioned, has a defined data scheme, is provided daily and available no later than 9 am in the morning for each day. These data health metrics can be stored as data 204 in data health repository 160. In one embodiment, each of the predefined characteristics that is consistent for the data set can be considered as a candidate for a data health metric. In one embodiment, the predefined characteristics include data format, data volume, data frequency, and time of arrival for the data. The system initially creates data health metrics based on the predefined characteristics in the metamodel. In one embodiment, users may create additional data metrics for individual data sets and/or groups of data sets. Such additional data metrics may be added to the metamodel, and become predefined characteristics. There may be characteristics that vary among each data batch in the data set. Those characteristics would not be used as data health metrics. For example, if the data arrives at various times throughout the day, but not consistently, the time of arrival characteristic may not be used as a data health metric.

The system monitors subsequent data batches of the data set to determine whether they meet the data health metrics. In the above example, when a new data batch is received the system verifies that the new data batch is partitioned, matches the defined data scheme, and was received by 9 am in the morning. The measured data health metrics for the data batch are metadata that can be stored as data 204 in data health repository 160. When the data health reasoner 150 indicates that a particular data batch does not meet the data health metrics, the data health reasoner 150 can send an alert, data 206, via application software system 110. As will be described below, the systems that utilize the data can customize their preferred metrics for alerts. For example, a data consuming application that accesses the data at 10 am may wish to be alerted only when the data expected at 9 am doesn't arrive by 9:45 am, since the 45 minute delay does not impact their use. Thus, the user can set up a custom alert, based on their own needs. This reduces unnecessary warnings and alerts.

The alert can be used by data consuming applications and/or users to determine whether to use the data from data store 140. For example, for some uses, if the current data is missing (e.g., a data batch expected is not received) the user may choose to exclude the data, or use a prior data batch in their processing. For some uses, the user may delay the processing until the data becomes available. If the current data batch has a different schema, this can make the data unusable for some systems. Thus, the user may choose to exclude the data from their processing, or verify that the schema change does not impact their use. Other options for addressing unavailable or unusable data can be chosen. However, by having this information, the user can affirmatively choose how to react. In this way, the system automatically generates and provides data health information to users of the data simplifying data processing and reducing wasted processing of out-of-date data.

Figure 3:
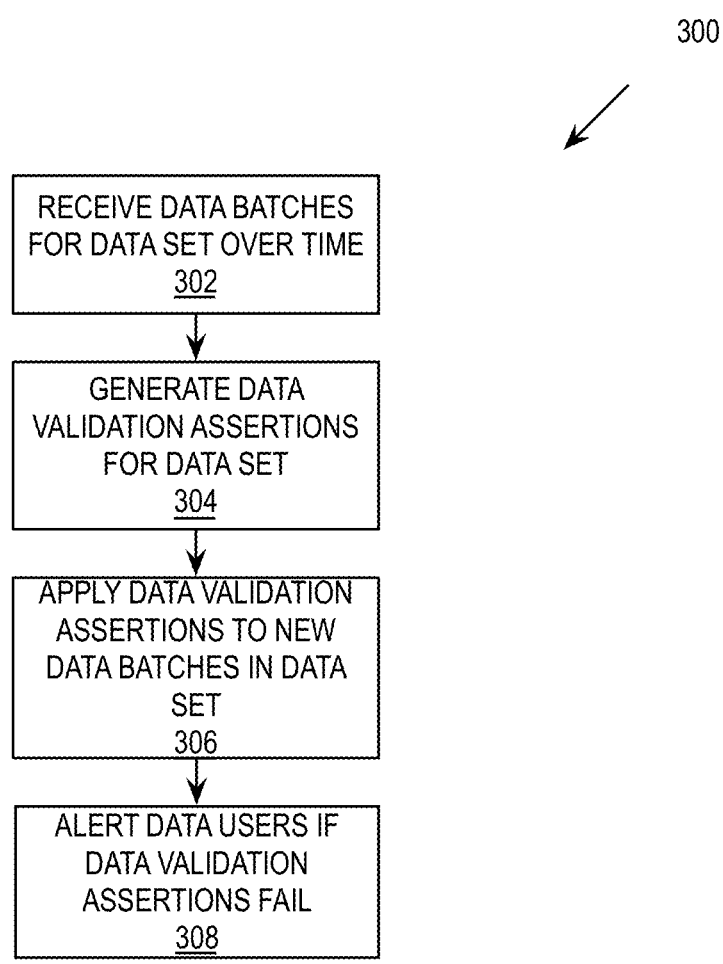
FIG. 3 is a flow diagram of an example method 300 to provide data health reasoning in accordance with some embodiments of the present disclosure.

FIG. 3 is a flow diagram of an example method 300 to provide data health reasoning in accordance with some embodiments of the present disclosure.

At operation 302, data is received for a new data set over time. In one embodiment, new data sets can be added to the repository at any time. In one embodiment, new data sets are added to the repository without pre-processing or setting up rules. The data health reasoner collects and uses the metadata, and does not interfere with data in the data repository.

In one embodiment, the system collects information about the data batch to establish the data health characteristics. In one embodiment, the system initially collects data but does not provide alerts. The system may provide information initially. In one embodiment, the system analyzes the data periodically, until sufficient data is collected to have consistent data characteristics. In one embodiment, the system calculates a confidence interval for the data characteristic, and when the confidence interval is above a threshold, alerts are sent. In one embodiment, the confidence interval is 95%.

At operation 304, data validation assertions are generated for the data set based on the data health metrics. As discussed above, the data health metrics can include partitioning, schema, size, and timing of the data batches. These data validation assertions are characteristics of the data that should be met by each new data set.

At operation 306, the data validation assertions are applied to new data batches received into the data set. The data health reasoner automatically tests the new data batch against the data validation assertions. That is, the system determines whether the new data batch meets all of the data validation assertions for the data set. In one embodiment, the data health reasoner stores the result of the testing in the data health repository as metadata associated with the data batch. In one embodiment, the data health reasoner also updates the metadata associated with the data set, based on the data batch evaluation results. In one embodiment, the data set status indicates the results of the applied data validation assertions against the latest data batch.

At operation 308, an alert is generated if one or more of the data validation assertions are not met by the data batch. The alert can be sent via a user interface. The alert can be an email. Other ways of providing the alert can be used. In one embodiment, the alert can be received by an automatic system that utilizes data. This method 300 is used continuously as new data sets are added to the repository. In one embodiment, the method 300 continuously monitors new data batches added to the data repository, and applies the data validation assertions against new data batches. In another embodiment, the data repository can notify the method 300 that a new data batch is received, and trigger the application of the data validation assertions. For existing data sets, the method 300 utilizes operations 306 and 308 only.

The methods described above can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, one or more of the methods above are performed by the data health reasoner component 150 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

Figure 4:
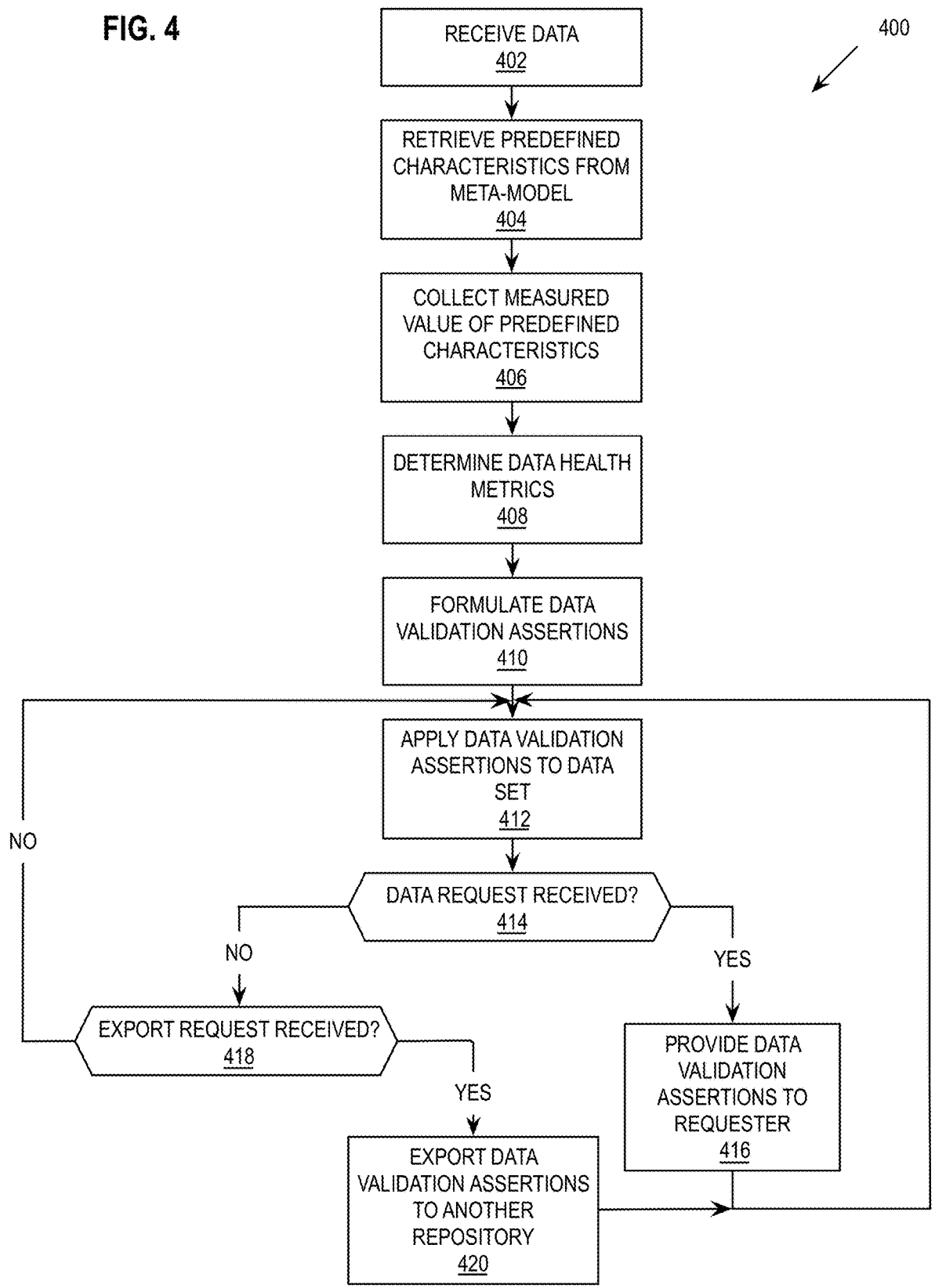
FIG. 4 is a flow diagram of an example method 400 to create data validation assertions for data health reasoning in accordance with some embodiments of the present disclosure.

FIG. 4 is a flow diagram of an example method 400 to create data validation assertions for data health reasoning in accordance with some embodiments of the present disclosure. At operation 402, data for a new data set is received. The new data set has unknown characteristics.

At operation 404, the metamodel representing the predefined data set characteristics are retrieved. The predefined characteristics in one embodiment are a set of meta-data characteristics, that describe some of the characteristics associated with a data set. The meta-data characteristics in one embodiment are based on an XML schema.

One exemplary XML schema is defined based on data validation assertions.

```
<xs:complexType name="DataHealthAssertion">
  <xs:sequence>
    <xs:element name="event" type="dhm:EventType"
        minOccurs="1" maxOccurs="unbounded" />
    <xs:element name="dataset" type="dhm:Dataset-
        Type" minOccurs="1" maxOccurs="1" />
    <xs:element name="metric" type="dhm:HealthMet-
        ricType" minOccurs="1"
        maxOccurs="unbounded" />
    <xs:element name="alert" type="dhm:AlertType"
        minOccurs="1" maxOccurs="unbounded" />
  </xs:sequence>
  <xs:attribute name="dataAssertionID" type="xs:ID"
      />
  <xs:attribute name="dataAssertionName" type="xs:
      string" />
  <xs:attribute name="dataAssertionDescription"
      type="xs:string" />
  <xs:attribute name="startingDate" type="xs:date-
      Time" />
  <xs:attribute name="expirationData" type="xs:date-
      Time" />
```

A data validation assertion in one embodiment is further defined by data assertion identifier (ID), data assertion name, starting data and expiration date, a definition of dataset, a collection of events, a collection of metrics and a collection of alerts.

The dataset type in one embodiment is further defined as:

```
<xs:complexType name="DatasetType">
  <xs:attribute name="databaseName" type="xs:string"
      use="required" />
  <xs:attribute name="tableName" type="xs:string"
      use="required" />
  <xs:attribute name="storageLocation" type="xs:
      string" use="optional" />
  <xs:attribute name="updateFrequency" type="xs:
      string" use="required" />
  <xs:attribute name="retention" type="xs:duration"
      use="optional" />
  <xs:attribute name="schema" type="xs:duration"
      use="optional" />
</xs:complexType>
```

The health metric type in one embodiment is further defined as:

```
<xs:complexType name="HealthMetricType">
<xs:sequence>
  <xs:element name="MetricIdentification">
    <xs:complexType>
      <xs:attribute name="metricName" type="xs:
          string" use="required" />
      <xs:attribute name="metricScope" type="dhm:
          MetricScopeType" />
    </xs:complexType>
  </xs:element>
  <xs:element name="metricScopeID" type="dhm:
      FunctionType" minOccurs="1" maxOccurs="1" />
  <xs:element name="metricCalculation" type="dhm:
      FunctionType" minOccurs="1" maxOccurs="1" />
</xs:sequence>
</xs:complexType>
```

In the definition of health metric type, both metricScopeID and metricCalculation are in one embodiment further defined as Metric Calculation Function Type, which is further defined as:

```
<xs:complexType
    name="MetricCalculationFunctionType">
  <xs:choice>
    <xs:element name="FonnulaBasedFunction"
        type="dhm:FormulaBasedFunctionType" />
    <xs:element name="ExternalFunction" type="dhm:
        ExternalFunctionType" />
  </xs:choice>
</xs:complexType>
```

Metric Calculation Function Type in one embodiment can be either Formula Based Function or External Function. In one embodiment, a Formula Based Function is further defined as:

```
<xs:complexType name="FormulaBasedFunctionType">
  <xs:complexContent>
    <xs:extension base="dhm:FunctionType">
      <xs:attribute name="expression" type="xs:string"
          use="required" />
    </xs:extension>
  </xs:complexContent>
</xs:complexType>
``` and an External Function is further defined as:

```
<xs:complexType name="ExternalFunctionType">
  <xs:complexContent>
    <xs:extension base="dhm:FunctionType">
      <xs:sequence>
        <xs:element name="InputParameter" minOc-
            curs="0" maxOccurs="unbounded">
          <xs:complexType>
            <xs:sequence>
              <xs:element name="ValueRetrieval"
                  type="dhm:MetricCalculationFunctionType"
                  />
            </xs:sequence>
            <xs:attribute name="name" type="xs:string"
                use="required" />
          </xs:complexType>
        </xs:element>
      </xs:sequence>
      <xs:attribute name="methodName" type="xs:
          string" />
      <xs:attribute name="serviceURL" type="xs:
          string" />
      <xs:attribute name="serviceType" type="xs:
          string" />
      <xs:attribute name="serviceSpecificationURL"
          type="xs:string" />
    </xs:extension>
  </xs:complexContent>
</xs:complexType>
```

In one embodiment, the parameter of External Function is recursively defined as Metric Calculation Function Type.

Both Metric Calculation Function Type and External Function in one embodiment extends Function Property type, which in one embodiment is further defined as:

```
<xs:complexType name="FunctionPropertyType">
  <xs:attribute name="returnType" type="xs:string"
      use="required" />
  <xs:attribute name="functionName" type="xs:string"
      />
  <xs:attribute name="functionID" type="xs:string" />
</xs:complexType>
```

The collection of events in data validation assertion define the source information, which in one embodiment is defined as Event Type:

```
<xs:complexType name="EventType">
  <xs:sequence>
    <xs:element name="attribute" type="dhm:EventAttributeType" minOccurs="1" maxOccurs="unbounded">
    </xs:element>
  </xs:sequence>
  <xs:attribute name="eventName" type="xs:string" use="required" />
</xs:complexType>
```

There is a collection of attributes in an event, in one embodiment, which is further defined as:

```
<xs:complexType name="EventAttributeType">
  <xs:attribute name="attributeName" type="xs:string" />
  <xs:attribute name="attributeType" type="xs:string" />
  <xs:attribute name="isID" type="xs:boolean" default="false" />
  <xs:attribute name="isArray" type="xs:boolean" default="false" />
</xs:complexType>
```

With events and metrics, alerts in one embodiment can be defined by specifying the condition and action.

```
<xs:complexType name="AlertType">
  <xs:sequence>
    <xs:element name="condition" type="dhm:ConditionType" />
    <xs:element name="action" type="dhm:ActionType" />
  </xs:sequence>
  <xs:attribute name="assertionName" type="xs:string" use="required" />
  <xs:attribute name="assertionID" type="xs:ID" use="required" />
</xs:complexType>
```

The condition type in one embodiment is further defined as one of three different kinds of types, namely: simple condition, unary operation on a condition, and binary operation with two operands.

```
<xs:complexType name="ConditionType">
  <xs:choice>
    <xs:element name="simpleCondition" type="dhm:SimpleConditionType" />
    <xs:sequence>
      <xs:element name="unaryOperation" type="xs:string" />
      <xs:element name="condition" type="dhm:ConditionType" />
    </xs:sequence>
    <xs:sequence>
      <xs:element name="booleanOperation" type="xs:string" />
      <xs:element name="leftCondition" type="dhm:ConditionType" />
      <xs:element name="rightCondition" type="dhm:ConditionType" />
    </xs:sequence>
  </xs:choice>
</xs:complexType>
```

Simple condition type in one embodiment can be further defined as one of three conditions, namely point condition, enumeration condition, and rang condition.

```
<
<xs:complexType name="SimpleConditionType">
  <xs:choice>
    <xs:element name="PointCondition" type="dhm:PointConditionType" minOccurs="1" maxOccurs="1" />
    <xs:element name="EnumerationCondition" type="dhm:EnumerationConditionType" minOccurs="1" maxOccurs="1" />
    <xs:element name="RangeCondition" type="dhm:RangeConditionType" minOccurs="1" maxOccurs="1" />
  </xs:choice>
  <xs:attribute name="metricName" type="xs:string" />
</xs:complexType>
```

Point condition, enumeration condition, and rang condition in one embodiment can be further defined as:

```
<xs:complexType name="PointConditionType">
  <xs:sequence>
    <xs:element name="compareOperation" type="xs:string" />
    <xs:element name="leftOperand" type="dhm:FunctionType" />
    <xs:element name="rightOperand" type="dhm:ValueType" />
  </xs:sequence>
</xs:complexType>
<xs:complexType name="RangeConditionType">
  <xs:sequence>
    <xs:element name="LowerBound" minOccurs="0">
      <xs:complexType>
        <xs:complexContent>
          <xs:extension base="dhm:FunctionType">
            <xs:attribute name="inclusive" type="xs:boolean" use="required" />
          </xs:extension>
        </xs:complexContent>
      </xs:complexType>
    </xs:element>
    <xs:element name="UpperBound" minOccurs="0">
      <xs:complexType>
        <xs:complexContent>
          <xs:extension base="dhm:FunctionType">
            <xs:attribute name="inclusive" type="xs:boolean" use="required" />
          </xs:extension>
        </xs:complexContent>
      </xs:complexType>
    </xs:element>
  </xs:sequence>
</xs:complexType>
<xs:complexType name="EnumerationConditionType">
  <xs:sequence>
    <xs:element name="EnumerationElement" type="dhm:FunctionType" maxOccurs="unbounded" />
  </xs:sequence>
</xs:complexType>
```

In one embodiment part of the Alert Type is action, which is defined as Action Type as:

```
<xs:complexType name="ActionType">
  <xs:sequence>
    <xs:element name="alertMessage" type="dhm:AlertMessageType" minOccurs="1" maxOccurs="1" />
```

```
<xs:element name="action" type="dhm:External-
    FunctionType" minOccurs="1" maxOccurs=
    "1" />
</xs:sequence>
```
Alert message can be defined in one embodiment as
```
<xs:complexType name="AlertMessageType">
  <xs:sequence>
    <xs:element name="messageTitle" type="dhm:
        FunctionType" maxOccurs="1" />
    <xs:element name="messageStrFunction"
        type="dhm:FunctionType" maxOccurs="1" />
  </xs:sequence>
  <xs:attribute name="emailAddress" type=
      "xs:string" />
</xs:complexType>
```

At operation 406, system collects the measured values of the predefined characteristics. As noted above, measured values are associated with each of the predefined characteristics in the metamodel. Some of the characteristics may not have a value. For example, some data is not partitioned. Thus, the partitioning metamodel characteristic is a null, e.g., unvalued. The predefined characteristics include the set of meta-characteristics that are available, and thus can be used to describe the data. As shown in FIG. 6 characteristics can include arrival frequency, partition type, expected arrival time, and schema. Other characteristics can include data structure, data size, and any other characteristic describing the data batch. In one embodiment, the metamodel is extendible using the metamodel language, and thus additional characteristics may be added to the metamodel.

At operation 408, data health metrics are determined based on the measured values. The health metrics define the characteristics of the data. In one embodiment, the data health metrics are based on the range of values for the various characteristics, and are chosen so that the data batches evaluated meet those health metrics. For example, if data batches were received between 8:45 am and 8:59 am, the health metric can be that the data batch arrives between 8:45 and 8:59 a.m. As another example, if the data batches were between 500 KB and 1 MB, the health metric would indicate that size range as being appropriate.

At operation 410, data validation assertions are formulated, based on the health metrics. The data validation assertions are the guarantees about the format and availability of the data. They reflect the consistent data health metrics that can be used to evaluate whether the data meets expectations. In one embodiment, the data validation assertions are formulated to set the range of sizes, arrival times, and other characteristics based on the health metrics of the data set. For example, if the health metric is that the data batch arrives between 8:45 and 8:59, the data validation assertion can be that the data arrives before 8:59 a.m. Data validation assertions may include a combination of multiple data health metrics. For example, the data validation assertion may be that a data batch larger than 50 KB of data was received by 9 am. Data validation assertions for a data set may include metrics based on more than one data batch. For example, a data validation assertion may be "each data batch received today is more than 50 KB of data." This is referred to as a compound metric.

Operations 402 through 410 set up the data validation assertions for a data set. In one embodiment, this process is initially performed when a new data set is added into the data repository. In one embodiment, the data validation assertions are refined as more data batches are received. Operations 412 through 420 describe the use of the data validation assertions.

At operation 412, the data validation assertions are applied to the data set. That is, the method 400 tests the data validation assertions against the data batches received in the data set. None of the data batches should fail the data validation assertions. This is used to verify that the data validation assertions are accurate.

Subsequently, the data validation assertions are applied to each data batch as it is received, in one embodiment. The characteristics of the data batch are compared to the data validation assertions, and if any data validation assertions are not met, they are flagged. As noted above, the method 400 can monitor the data repository, detect a new data batch, and apply the data validation assertions, in one embodiment. In another embodiment, the data repository can notify the data health reasoner that new data has been received, which can trigger the data health reasoner to apply the data validation assertions to the new data. In one embodiment, the data validation assertions can be applied during a processing period before the data batch is made available to users. In another embodiment, the assertions can be applied as the data streams are received into the repository. The data health reasoner does not alter the operation of the data repository, but rather utilizes the metadata to provide information about the data in the repository.

At operation 414, the system determines whether a data request is received. A data request is a request to access one or more data batches of the data set, and can be originated by an application, system, or user. In one embodiment, a data request is a pull request. The data request can be a in any format such as HTTP, JSON, application programming interface (API) formatted request, etc. The data request can be a request to send data, or a data pull, pulling the data from the repository. When a data request is received, in one embodiment, at operation 416, the data validation assertions are provided to the requesting user, device, or system. The process then returns to operation 412 to continue applying the data validation assertions to the new data batches in the data set.

If no data request was received at operation 414, at operation 418 the system determines whether an export request was received by the data health reasoner. Export requests, in one embodiment, come from an administrator to propagate the data validation assertions to another system. The export request can be received via an application programming interface (API), or another format. An export request enables the system to propagate the data validation assertions to another repository which receives the data set. This increases efficiency because it allows the first system to determine the data validation assertions, and the other systems to take advantage of this determination. If an export request is received, at operation 420 the data validation assertions are exported in a transferrable format, such as XML. In one embodiment, the portable format makes the transfer of data seamless.

The process then returns to applying the data validation assertions to data sets. In this way, the present system determines the appropriate assertions, and applies them to data streams.

The methods described above can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, one or more of the methods above are performed by the data health reasoner component 150 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

Figure 5:
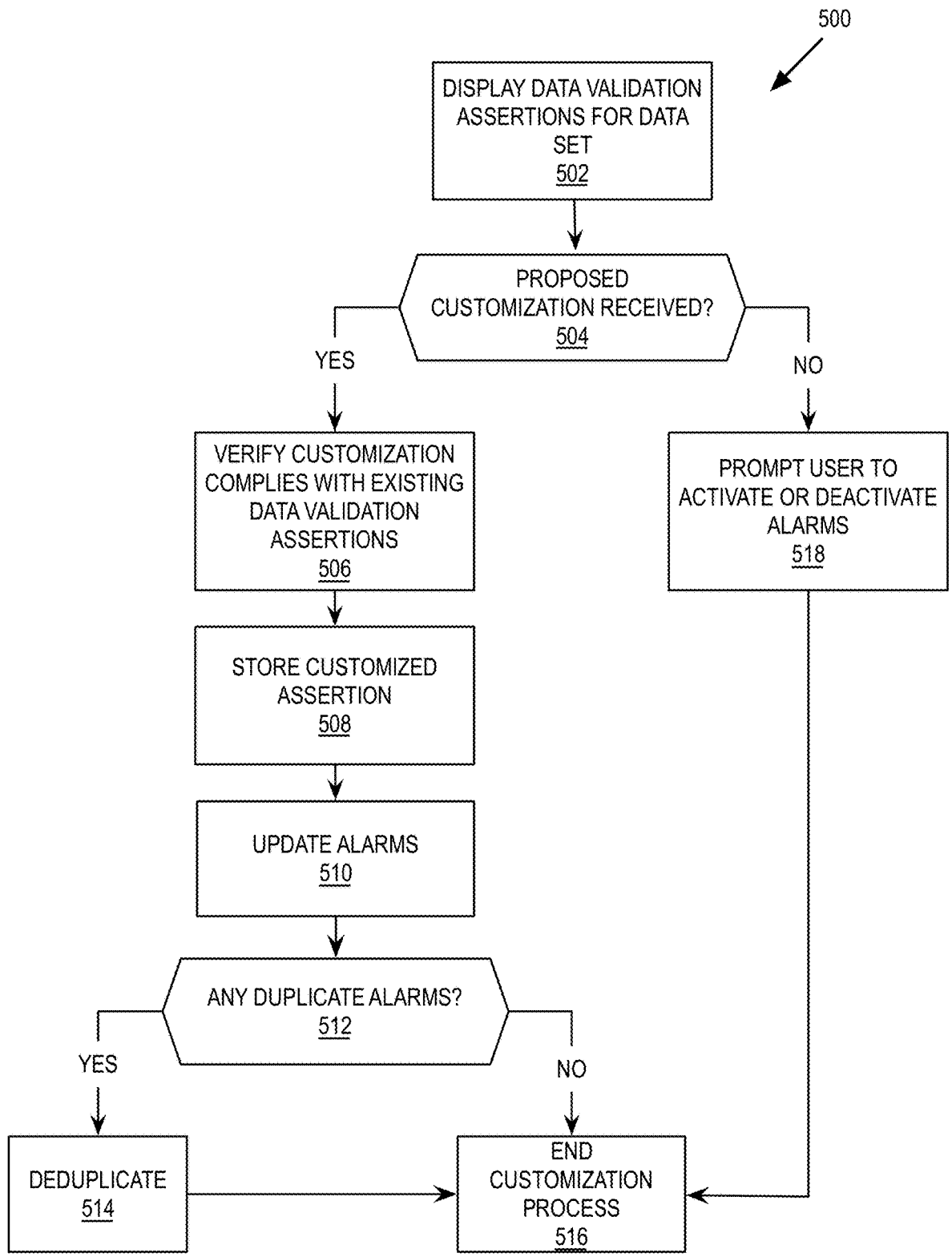
FIG. 5 is a flow diagram of an example method 500 to edit customized data validation assertions in accordance with some embodiments of the present disclosure.

FIG. 5 is a flow diagram of an example method 500 to edit customized data validation assertions in accordance with some embodiments of the present disclosure. At operation 502, the data validation assertions for the data set are displayed. In one embodiment, the data validations assertions are accessed via the data health reasoner 150. FIG. 6 is an example of a user interface 600 to enable editing of customized data validation assertions in accordance with some embodiments of the present disclosure.

At operation 504, a proposed customization can be received. The proposed customization changes one or more of the health data assertions for the data set, in one embodiment. The proposed customization may also add a new data health assertion. This change only applies to the assertions for the particular system, device, or user making the request. As seen in FIG. 6, in one embodiment, each of the health data assertions 602, 610 have an editing option associated with them 606, 614.

If no customization is received, the user can activate or deactivate alarms at operation 518. As seen in FIG. 6, some changes have alerts set 612, while others have no alert 604. The user can change the alert settings. As discussed above, when one or more of the data validation assertions are not met by a data batch an alert is sent to those systems, applications, and/or users that have alerts set for the missed data validation assertions. In one embodiment, there is a default set of alarms for each data set. In one embodiment, the default set is to send an alarm for any unmet data validation assertions.

Returning to FIG. 5, if a proposed customization was received at operation 504, at operation 506, the system verifies that the proposed customization complies with the existing data validation assertions. For example, a customized data validation assertion can require that data be available at 9 am Pacific Time, if the existing data validation assertion states that the data should arrive by 8:30 am. However, a data validation assertion requiring arrival by 7:30 for data that has as its default data validation assertion an arrival by 8:30 would not be permitted. If the user requests a customization that is outside the existing parameters, it is rejected in one embodiment. In one embodiment, the user interface may limit the options to, for example, moving the time forward.

At operation 508, the customized data validation assertion is stored. At operation 510, the alarms for the requesting system, application, and/or user are updated with the customized assertion. The alarms correspond to the user's customized assertions. Thus, if the user sets the customized data validation assertion as data availability at 9:00 am Pacific time, if the data is late from its calculated data validation assertion of 8:30 am Pacific, but arrives prior to the 9:00 am deadline, the user will not receive an alert.

At operation 512, the system determines whether there are any duplicate alarms. Duplicate alarms can arise, for example, if the user had an existing alarm for the default data validation assertion which they then customized. If there are duplicate alarms, at operation 514, the alarms are deduplicated. The customized alarms are given priority over default alarms, in one embodiment. The customization method 500 then ends at operation 516.

The methods described above can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, one or more of the methods above are performed by the data health reasoner component 150 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

Figure 7:
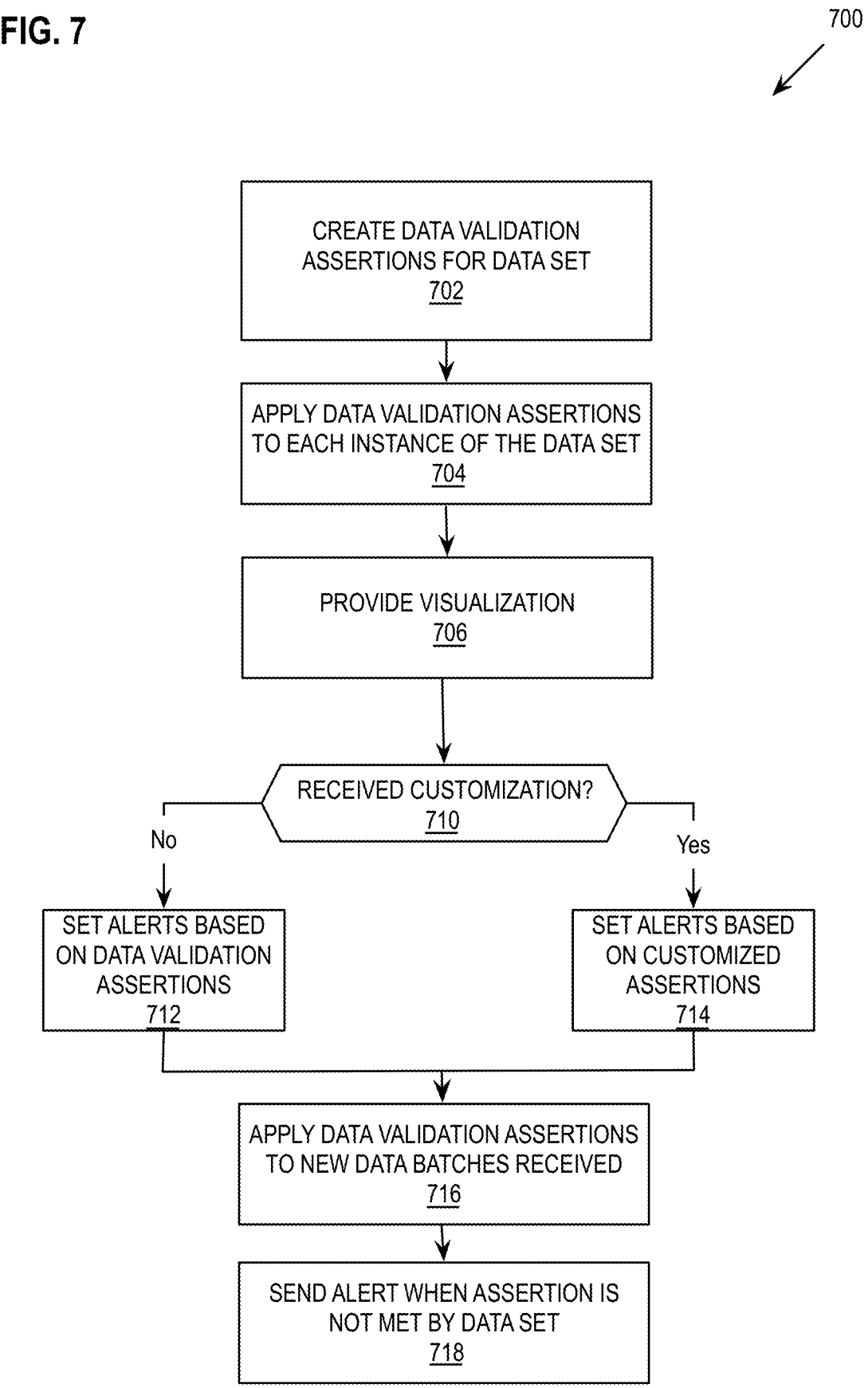
FIG. 7 is a flow diagram of an example method 700 to provide data health reasoning in accordance with some embodiments of the present disclosure.

FIG. 7 is a flow diagram of an example method 700 to provide data health reasoning in accordance with some embodiments of the present disclosure. At operation 702, data validation assertions are created for the data set. Method 400 described above can be used create the data validation assertions.

At operation 704, the data validation assertions are applied to each instance of the data set. As described above, the data validation assertions can be applied to each data batch when it is added to the data repository.

At operation 706, a visualization of the data state is provided. In one embodiment, the visualization can provide status of one or more data sets. In one embodiment, the visualization can include data sets selected by a user, and provide a status indicator for each of the data sets selected. The status indicator can indicate whether each data set is currently meeting its data validation assertions.

At operation 710, the method 700 determines whether a customization has been received for one or more of the data validation assertions. If no customization was received, at operation 712, the alerts are set based on the baseline data validation assertions. If customizations have been received, then at operation 714 alerts are set based on the customized assertions.

At operation 716, the data validation assertions are applied to the new data batches as they are received. At operation 718, alerts are sent when one or more assertions are not met by the data set, after a new data batch is received. The visualization is also updated based on the data validation assertions. In this configuration, the system provides two types of notice to data consumers, the visualization of the data state and individual alerts. In one embodiment, the individual alerts can be sent via a dashboard, email, text, or in another format.

The methods described above can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, one or more of the methods above are performed by the data health reasoner component 150 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

Figure 8:
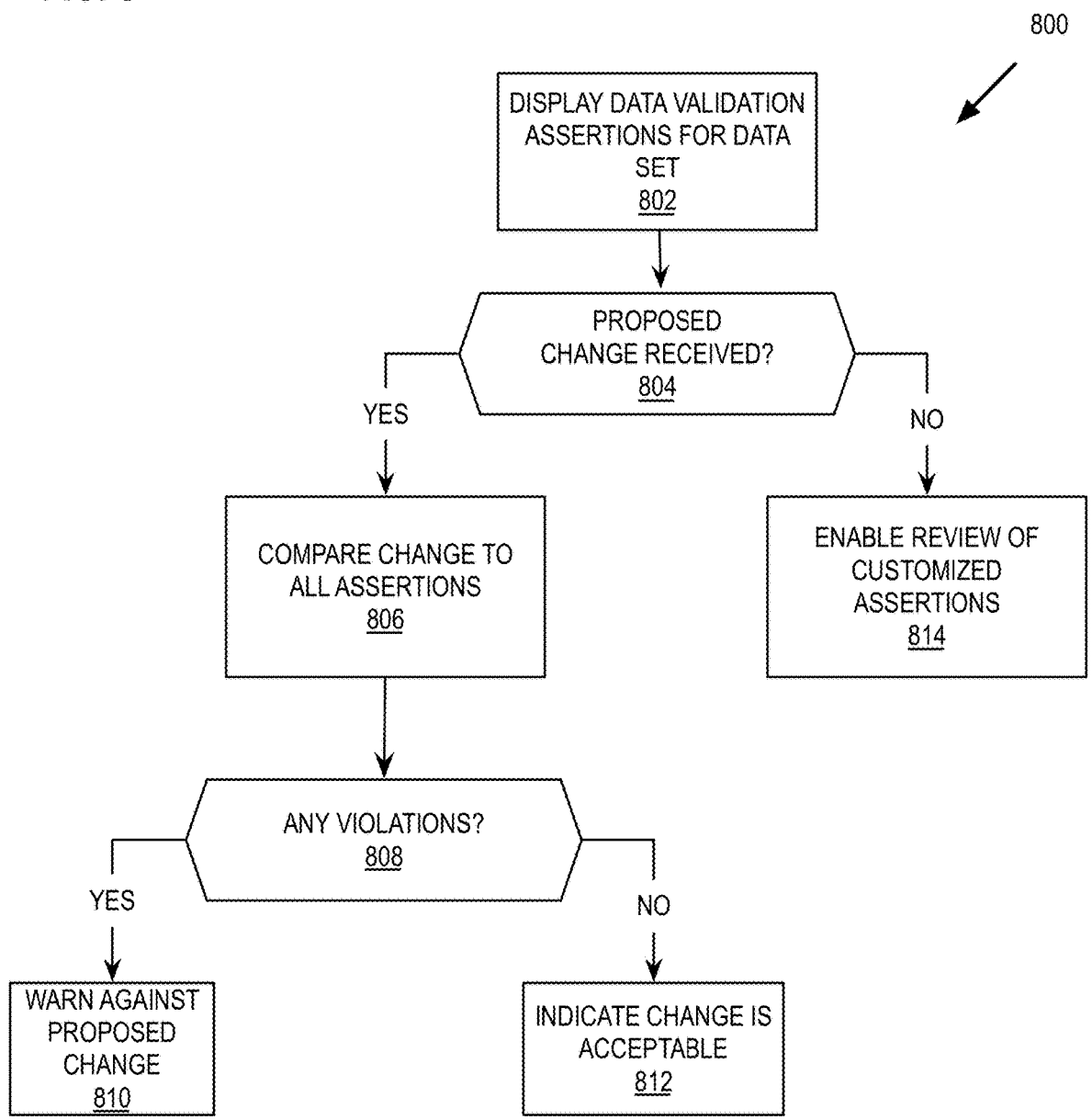
FIG. 8 is a flow diagram of an example method 800 to evaluate proposed changes to data characteristics in accordance with some embodiments of the present disclosure.

FIG. 8 is a flow diagram of an example method 800 to evaluate proposed changes to data characteristics in accordance with some embodiments of the present disclosure. This method 800 in one embodiment is made available to external data providers who already have data in the data repository, with associated data validation assertions.

At operation 802, the data validation assertions for the data set are displayed.

At operation 804, the method 800 determines whether a proposed change to the data set was received. The proposed change can be a change to any data characteristic, including format, frequency, time of arrival, schema, etc. If no change is proposed, at operation 814, the method 800 in one embodiment enables review of the existing customized data validation assertions. In one embodiment, the system provides the default data validation assertions, and indicates any which have been customized by any users, applications, or devices.

If there is a proposed change received, the proposed change is compared to all data validation assertions, at operation 806.

The method 800 at operation 808 determines whether the proposed change violates any of the data validation assertions. If so, a warning against the proposed change is provided 810. In one embodiment, the violation is specified, so that the change can be adjusted to comply with the assertions.

If no violation is found, the method 800 indicates that the proposed change is acceptable, at operation 812. This method 800 enables data providers to test their proposed changes, before implementing them, and potentially breaking systems that rely on their data. This further provides an improvement to the functioning of the computer systems which utilize such data.

The methods described above can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, one or more of the methods above are performed by the data health reasoner component 150 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

FIG. 9 illustrates an example machine of a computer system 900 within which a set of instructions, for causing the machine to perform any one or more of the methodologies discussed herein, can be executed. In some embodiments, the computer system 900 can correspond to a component of a networked computer system (e.g., the computer system 100 of FIG. 1) that includes, is coupled to, or utilizes a machine to execute an operating system to perform operations corresponding to the data health reasoner 150 of FIG. 1.

Data health reasoner 150 and data health repository 160 are shown as part of instructions 912 to illustrate that at times, portions of data health reasoner 150 and/or data health repository 160 are executed by processing device 902. However, it is not required that data health reasoner 150 and/or data health repository 160 be included in instructions 912 at the same time and any portions of data health reasoner 150 and/or data health repository 160 are stored in other components of computer system 900 at other times, e.g., when not executed by processing device 902.

The machine can be connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a smart phone, a tablet PC, a set-top box (STB), a Personal Digital Assistant (PDA), a cellular telephone, a web appliance, a server, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes a processing device 902, a main memory 904 (e.g., read-only memory (ROM), flash memory, dynamic random-access memory (DRAM) such as synchronous DRAM (SDRAM) or Rambus DRAM (RDRAM), etc.), a memory 906 (e.g., flash memory, static random-access memory (SRAM), etc.), an input/output system 'Z10, and a data storage system 940, which communicate with each other via a bus 930.

Data health reasoner 150 and data health repository 160 are shown as part of instructions 914 to illustrate that at times, portions of data health reasoner 150 and/or data health repository 160 can be stored in main memory 904. However, it is not required that data health reasoner 150 and/or data health repository 160 be included in instructions 914 at the same time and any portions of data health reasoner 150 and/or data health repository 160 can be stored in other components of computer system 900.

Processing device 902 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 902 can also be one or more special-purpose processing devices such as an application specific integrated circuit (ASIC), a field programmable gate array (FPGA), a digital signal processor (DSP), network processor, or the like. The processing device 902 is configured to execute instructions 912 for performing the operations and steps discussed herein.

The computer system 900 can further include a network interface device 908 to communicate over the network 920. Network interface device 908 can provide a two-way data communication coupling to a network. For example, network interface device 908 can be an integrated-services digital network (ISDN) card, cable modem, satellite modem, or a modem to provide a data communication connection to a corresponding type of telephone line. As another example, network interface device 908 can be a local area network (LAN) card to provide a data communication connection to a compatible LAN. Wireless links can also be implemented. In any such implementation network interface device 908 can send and receives electrical, electromagnetic, or optical signals that carry digital data streams representing various types of information.

The network link can provide data communication through at least one network to other data devices. For example, a network link can provide a connection to the world-wide packet data communication network commonly referred to as the "Internet," for example through a local network to a host computer or to data equipment operated by an Internet Service Provider (ISP). Local networks and the Internet use electrical, electromagnetic, or optical signals that carry digital data to and from computer system computer system 900.

Computer system 900 can send messages and receive data, including program code, through the network(s) and network interface device 908. In the Internet example, a server can transmit a requested code for an application program through the Internet 628 and network interface device 908. The received code can be executed by processing device 902 as it is received, and/or stored in data storage system 940, or other non-volatile storage for later execution.

Data health reasoner 150 and data health repository 160 are shown as part of instructions 944 to illustrate that at times, portions of data health reasoner 150 and/or data health repository 160 can be stored in data storage system 940. However, it is not required that data health reasoner 150 and/or data health repository 160 be included in instructions 944 at the same time and any portions of data health reasoner 150 and/or data health repository 160 can be stored in other components of computer system 900.

The input/output system 910 can include an output device, such as a display, for example a liquid crystal display (LCD) or a touchscreen display, for displaying information to a computer user, or a speaker, a haptic device, or another form of output device. The input/output system 910 can include an input device, for example, alphanumeric keys and other keys configured for communicating information and command selections to processing device 902. An input device can, alternatively or in addition, include a cursor control, such as a mouse, a trackball, or cursor direction keys for communicating direction information and command selections to processing device 902 and for controlling cursor movement on a display. An input device can, alternatively or in addition, include a microphone, a sensor, or an array of sensors, for communicating sensed information to processing device 902. Sensed information can include voice commands, audio signals, geographic location information, and/or digital imagery, for example.

The data storage system 940 can include a machine-readable storage medium 942 (also known as a computer-readable medium) on which is stored one or more sets of instructions 944 or software embodying any one or more of the methodologies or functions described herein. The instructions 912, 914, 944 can also reside, completely or at least partially, within the main memory 904 and/or within the processing device 902 during execution thereof by the computer system 900, the main memory 904 and the processing device 902 also constituting machine-readable storage media.

In one embodiment, the instructions 926 include instructions to implement functionality corresponding to data health reasoner (e.g., the data health reasoning component 140 of FIG. 1). While the machine-readable storage medium 942 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system, such as the computing system 100, can carry out the computer-implemented method of generating data validation assertions and verifying that data batches meet these data validation assertions, in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
maintaining a data repository including a plurality of heterogeneous data sets, each of the data sets comprising a plurality of data batches received over time;
receiving a new data set in the data repository;
retrieving from a stored metamodel a set of predefined characteristics for the new data set, wherein the set of predefined characteristics includes a data schema;
determining based on measured values of the predefined characteristics, a set of data health metrics for the new data set;
using the data health metrics to automatically formulate a plurality of data validation assertions for the data set;
applying the plurality of data validation assertions to each data batch received for the data set;
wherein each of the plurality of heterogeneous data sets in the data repository have a plurality of data validation assertions derived from the stored metamodel.

2. The method of claim 1, wherein the data schema is an XML data schema.

3. The method of claim 1, further comprising:
determining that there is no conflict between the plurality of data validation assertions.

4. The method of claim 1, further comprising:
receiving one or more customized data validation assertions, the customized data validation assertions describing the data health metrics to be met by each instance of the data set.

5. The method of claim 4, further comprising:
receiving a proposed change to a characteristic of the data set; and
determining whether the proposed change would violate any of the one or more customized data validation assertions.

6. The method of claim 4, further comprising:
sending an alert when a data set is received into the data repository that does not meet one of the one or more customized data validation assertions.

7. The method of claim 6, further comprising:
eliminating alert duplication by aggregating the data validation assertions.

8. The method of claim 1, wherein data specific health metrics comprise one or more of: an arrival frequency and an expected arrival time.

9. The method of claim 1, wherein one of the data validation assertions associated with the data health metrics comprises data availability at a set time, wherein the set time is customizable.

10. The method of claim 1, further comprising:
providing a visualization of the plurality of data validation assertions to a user;
receiving a customization for one or more of the plurality of data validation assertions;
setting alerts by the user for any data batches that do not meet one or more of the data validation assertions;
applying the plurality of data validation assertions to subsequent instances of the data batch; and
sending alerts when the data batch does not meet the one or more customized data validation assertions.

11. A system comprising:
a memory configured to store a metamodel including a plurality of predefined characteristics for data sets;
a data repository configured to store a plurality of heterogeneous data sets, each of the plurality of data sets comprising a plurality of data batches received over time;
an interface configured to receive a new data set for storage into the data repository;
a data health reasoner configured to retrieve the stored metamodel from the memory, the stored metamodel including a plurality of predefined characteristics, including a data schema;
the data health reasoner configured to determine measured values of a subset of the plurality of predefined characteristics identified based on the stored metamodel;
the data health reasoner configured to determine a set of data health metrics for the data set based on the measured values of the subset of the set of the predefined characteristics;
the data health reasoner further configured to formulate a plurality of data validation assertions for the data set;
the data health reasoner further configured to apply the plurality of data validation assertions to each instance of the data set;
a user interface configured to receive a request from a service that consumes data from the data set, and provide the plurality of data validation assertions to the service with the data from the data set;
wherein each of the plurality of heterogeneous data sets in the data repository have a plurality of data validation assertions derived from the stored metamodel.

12. The system of claim 11, wherein the data schema is an XML data schema.

13. The system of claim 11, further comprising:
the data health reasoner further configured to determine that there is no conflict between the plurality of data validation assertions.

14. The system of claim 11, further comprising:
a user interface configured to receive one or more customized data validation assertions, the customized data validation assertion describing a data health metric to be met by each instance of the data set.

15. The system of claim 14, further comprising:
the user interface configured to send an alert when a data set is received that does not meet one of the one or more customized data validation assertions.

16. The system of claim 15, further comprising:
the data health reasoner configured to aggregate the data validation assertions to eliminate alert duplication.

17. The system of claim 14, wherein the customized data validation assertion associated with the data comprises data availability at a set time, wherein the set time can be customized.

18. The system of claim 11, further comprising:

an external user interface configured to receive a proposed change to a characteristic of the data set; and the data health reasoner further configured to determine whether the proposed change would violate any of the data validation assertions.

19. The system of claim 11, wherein data health metrics comprise one or more of: arrival frequency and expected arrival time.

20. A non-transitory computer readable storage medium storing one or more programs for execution by one or more processors, the one or more programs comprising instructions for:

maintaining a data repository including a plurality of heterogeneous data sets, each of the data sets comprising a plurality of data batches received over time;

receiving a new data set in the data repository;

retrieving from a stored metamodel a set of predefined characteristics for the new data set, the predefined characteristics for the new data set including a data schema;

determining based on measured values of the predefined characteristics, a set of data health metrics for the new data set;

using the data health metrics to automatically formulate a plurality of data validation assertions for the data set;

applying the plurality of data validation assertions to each data batch received for the data set;

wherein each of the plurality of heterogeneous data sets in the data repository have a plurality of data validation assertions derived from the stored metamodel.

* * * * *